United States Patent

[11] 3,620,613

[72] Inventor Hiromitsu Watanabe
 Tokyo, Japan
[21] Appl. No 809,342
[22] Filed Mar. 21, 1969
[45] Patented Nov. 16, 1971
[73] Assignee Fuji Photo Film Co., Ltd.
 Nakanuma, Minami-Ashigara Machi,
 Ashigara-Kamigun, Kanagawa, Japan
[32] Priority May 10, 1968
[33] Japan
[31] 43/31329

[54] AUTOMATIC FOCUSING DEVICE FOR PROJECTORS
 5 Claims, 8 Drawing Figs.

[52] U.S. Cl. .................................................. 353/101
[51] Int. Cl. .................................................. G03b 3/00
[50] Field of Search .................................................. 353/69,
 101; 352/140; 95/44; 356/122, 186

[56] References Cited
UNITED STATES PATENTS

| | | | |
|---|---|---|---|
| 3,336,851 | 8/1967 | Warshawsky.................. | 352/140 X |
| 3,450,883 | 6/1969 | Thomas.......................... | 353/69 X |
| 3,469,925 | 9/1969 | Ubbach et al.................. | 353/101 X |

FOREIGN PATENTS

| | | | |
|---|---|---|---|
| 216,786 | 8/1961 | Austria.......................... | 353/101 |

Primary Examiner—Harry N. Haroian
Attorney—Sughrue, Rothwell, Mion, Zinn & Macpeak ABSTRACT: An image projected onto the projection screen by a projector is automatically focused by utilizing a photoconductive element which receives the light reflected from the projected screen. The photoconductive element is provided with a boundary to be in alignment with the boundary of the image of the screen to be projected with the projection image. The displacement of the boundary of the image of the screen out of the light received by the element, which automatically controls the focusing system of the projector by means of a servomotor or the like.

PATENTED NOV 16 1971　　3,620,613
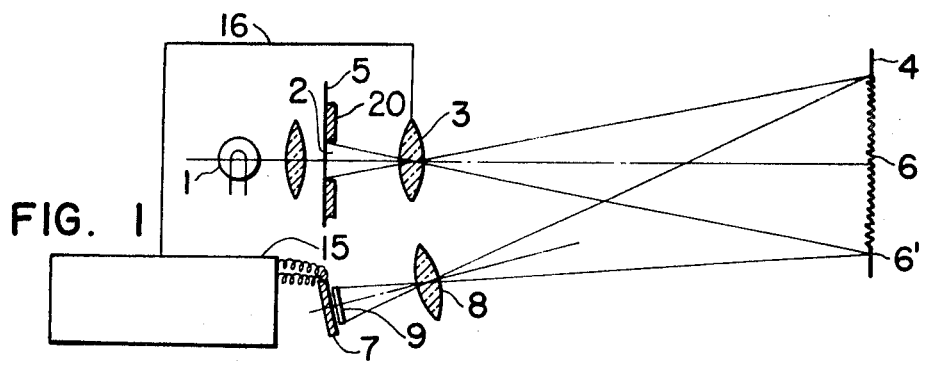
FIG. 1
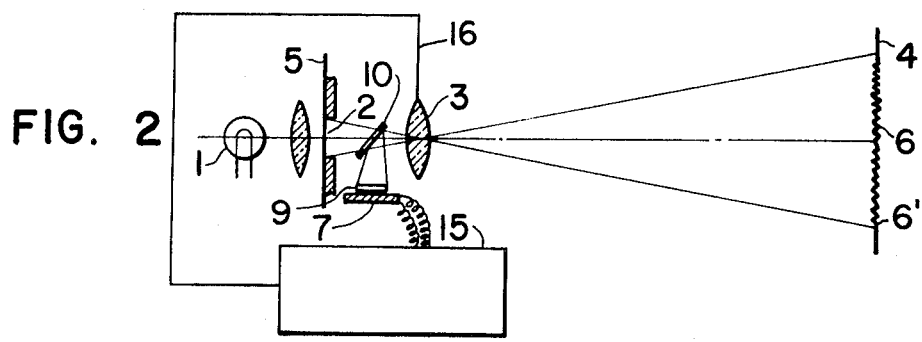
FIG. 2
FIG. 3A　　FIG. 3B　　FIG. 4A　　FIG. 4B
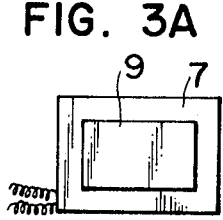 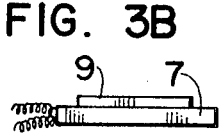  
FIG. 6
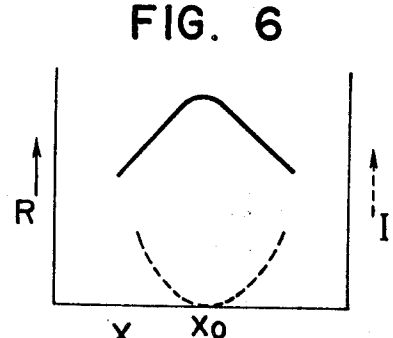
FIG. 5
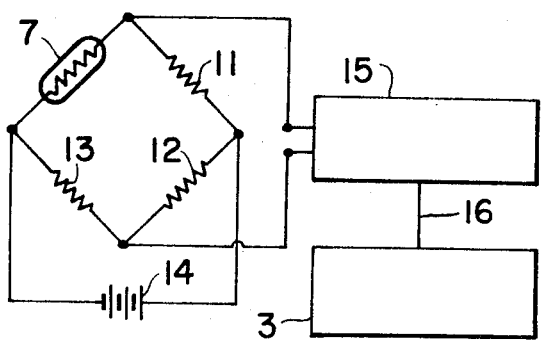

AUTOMATIC FOCUSING DEVICE FOR PROJECTORS

BACKGROUND OF THE INVENTION focusing

The present invention relates to an automatic-focusing device for projectors which automatically controls the focusing system of the projector to sharply focus the image projected onto the projection screen.

In a projector such as a motion picture projector, a slide projector or the like, the image projected on the projection screen is required to be focused sharply. In conventional projectors, the focusing operation has been made manually every time the image on the screen becomes out of focus. It has been, therefore, very troublesome to focus the image and inaccuracy of the image sharpness has been inevitable.

SUMMARY OF THE INVENTION

In accordance with the present invention, there is provided a light detecting receiving means and as a photoconductive element in the light path of the reflected light from the projection screen. The photoconductive element is disposed element is covered with a rectangular mask the outline of which resembles the outline of the screen. The reflected image of the screen is projected onto the photoconductive element in alignment with the rectangular obstacle. The displacement out of alignment of the reflected light image with the mask is transmitted to a driving means such as a servomotor so as to control the focusing system of the projector.

According to the present invention, since the image projected onto the projection screen is automatically focused, any manual focusing operation is not needed, and the sharpness of the projected image remains stable.

It is an object of the present invention to provide an automatic focusing device for projectors.

BRIEF DESCRIPTION OF THE DRAWINGS

FIG. 1 is a schematic view of an embodiment of the automatic-focusing device in accordance with the present invention.

FIG. 2 is a schematic view of another embodiment of the automatic-focusing device in accordance with the present invention.

FIG. 3A is a front view of an embodiment of the light-receiving portion of the automatic-focusing device.

FIG. 3B is a side view of FIG. 3A.

FIG. 4A is a front view of another embodiment of the light-receiving portion of the automatic-focusing device.

FIG. 5 is a diagram of the electric circuit wherein the light-receiving portion is connected.

FIG. 6 is a diagram showing the variation of the resistance in the light-receiving portion and the variation of the input current into the automatic focus-controlling means in the device in accordance with the present invention. DESCRIPTION OF THE PREFERRED EMBODIMENT Now referring to the drawings, as best shown in FIG. 1, the sharpness of the outline of the square image projected onto the screen, which is the image of the aperture 6' on the picture image 6 of the film 5, is examined. The image is projected onto the screen by a projector which has a light source 1, an aperture 2, and a projection lens 3. The detected lack of sharpness of the image of the aperture on the screen 4 is transmitted to a means for controlling the focusing position of the projection lens 3. The detecting lens system 8 for focusing the aperture image 6' is provided near the projection lens system 3 and the light from the projection screen 4 is projected onto a light detecting receiving means such as a detecting light-receiving member 7 partly covered with a light-shielding mask 9 which has the same outline as that of the image of the aperture 6'. The outline of the projected image on the detecting light-receiving member 7 is in alignment with the outline of the light-shielding mask 9. And the image of the aperture 6' has a reduced sharpness when the image is out of focus. Therefore, when the image is out of focus, a part of the light from the screen is received by the light-receiving member 7 and the resistance thereof is varied.

Referring to FIG. 2, the detecting lens in the device in accordance with the present invention may be used to serve also as the projecting lens 3. In this case, a half-transparent mirror 10 is skewly provided between the lens system 3 serving as both the projection lens and detecting lens and the film 5. The aperture image 6' is reflected to the outside of the projection light flux and is focused onto the light-receiving member 7. By making the distance between the lens system 3 and the film face 5 equal to the distance between the lens system 3 and the light-receiving member 7, the image on the light-shielding mask 9 is focused when the image 6 on the screen 4 is focused.

As shown in FIGS. 3A and 3B, the light-shielding mask 9 may be formed in the shape of the aperture image 6' so that any lack of sharpness of the image on the screen may be detected by the variation of the electrical resistance of the light-receiving member 7 which is made a little larger than the light-shielding mask 9. However, because the shape of the aperture image 6' on the light-receiving member 7 varies according to the angle made by the optical axis of the detecting lens system 8 and that of the projection lens system 3, which angle varies relative to the distance to the screen 4 from the projector, an elongated light-receiving member 7 and a mask 9 are preferred to be used for detecting the sharpness of the outline of the aperture image 6' as shown in FIGS. 4A and 4B.

In order to transmit the detected output from the light-receiving member 7 to the controlling mechanism 15, a bridge circuit as shown in FIG. 5 can be employed.

Referring to FIG. 5, the reference characters 11, 12, denote fixed resistances, 13 denotes a variable resistor for varying the resistance value thereof in response to the variable resistor for varying the resistance value thereof in response to the variation of the resistance of the light-receiving member 7, and 14 denotes a direct current source connected to the bridge circuit with the light-receiving member 7. The electric current of the bridge circuit when it is in balance is sent to the controlling mechanism 15 for controlling the focal length of the projection lens system 3. Since the electric resistance of the photoconductive element, such as cadmium sulfide (CdS), is reduced as the light quantity received by the element is increased, the relationship between the moving position X of the projection lens 3 and the resistance R (real line) and the output current I (broken line) is represented by the diagram as shown in FIG. 6. In the diagram in FIG. 6, $X_0$ indicates the optimum point position. That is, if the image gets out of focus, the resistance of the light-receiving member 7 is reduced to break the balance of the bridge circuit and the output current from the circuit is sent to the controlling mechanism 15. This results in a power source such as a motor being operated by the current which, in turn, drives a gear mechanism for moving the projection lens system to the proper position to focus the image sharply. The interconnection between control mechanism 15 and the driving means for the lens system is schematically represented by line 16 shown in FIGS. 1, 2 and 5.

As to the means for moving the lens system to the proper position for focusing, various conventional devices can be employed, but a device which is normally set at the fore focus (or back focus) and is moved in only one direction by the output current and which movement is stopped when the output current becomes zero is preferred to be employed for the sake of simplicity in the construction of the overall system.

The above-described embodiment is just an example of a member of peak value detecting methods. According to the detecting method, various photoresponsive elements can be used such as a photocell, solar battery, phototransistor, photomultiplier and so forth. Those elements which reduce the electrical signal in response to a variation in the light value can be used for receiving the light.

The invention and its attendant advantages will be understood from the foregoing description. It will be apparent that variations and modifications can be made within the spirit and scope of the invention. I do not wish to be restricted to the specific form shown or uses mentioned except as defined in the accompanying claims, wherein various portions have been separated for clarity of reading and not for emphasis.

What I claim is:

1. An automatic-focusing device for projectors which comprises a projection lens means provided on the projector for focusing the image onto a screen, a light detecting receiving means for receiving a reflected image from the screen, a light-shielding mask fixedly disposed on said light detecting receiving means wherein said projection lens focuses the reflected image onto said light detecting receiving means, the outline of said light-shielding mask being at least partially in alignment with the outline of the reflected focused image projected towards the light detecting receiving means, and a controlling means for controlling the focal length of the projection lens means according to the light quantity received by said light detecting receiving means, whereby the image projected onto the screen is automatically focused.

2. The device according to claim 1 wherein said projection lens means comprises two lenses, one lens of which focuses the image on said screen, and the other lens of which focuses the reflected image from said screen onto said light detecting receiving means.

3. The device according to claim 1 wherein said projection lens means comprises a single lens which both focuses the image on said screen and focuses the reflected image from said screen onto said light detecting receiving means.

4. The device according to claim 1 wherein said light detecting receiving means is a photoconductive element.

5. The device according to claim 1 wherein said controlling means comprises an electric bridge circuit and motor for controlling the focal length of the projection lens means.

* * * * *